(12) United States Patent
Chen et al.

(10) Patent No.: US 11,639,755 B2
(45) Date of Patent: May 2, 2023

(54) VALVE SEAT ASSEMBLY

(71) Applicant: FISHER JEON GAS EQUIPMENT (CHENGDU) CO., LTD., Chengdu (CN)

(72) Inventors: Shengjin Chen, Chengdu (CN); Jie Yuan, Chengdu (CN); Yanbo Shi, Chengdu (CN); Le Wang, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 144 days.

(21) Appl. No.: 17/153,638

(22) Filed: Jan. 20, 2021

(65) Prior Publication Data

US 2021/0222785 A1   Jul. 22, 2021

(51) Int. Cl.
  *F16K 15/02*    (2006.01)
  *F16K 17/04*    (2006.01)
(52) U.S. Cl.
  CPC ........ *F16K 17/0466* (2013.01); *F16K 15/026* (2013.01)
(58) Field of Classification Search
  CPC .......................... F16K 15/026; F16K 17/0466
  See application file for complete search history.

(56) References Cited

U.S. PATENT DOCUMENTS 2,670,922 A * 3/1954 Carlisle ................. F16K 15/026
                                                  137/540
4,271,862 A * 6/1981 Snoek ....................... F16K 1/34
                                                  137/511

OTHER PUBLICATIONS

U.S. Appl. No. 17/022,837, Modular Valve System, filed Sep. 16, 2020.

* cited by examiner

*Primary Examiner* — P. Macade Nichols
(74) *Attorney, Agent, or Firm* — Marshall, Gerstein & Borun LLP

(57) ABSTRACT

A flow control device includes a valve body defining an inlet, an outlet, and a flow path. A valve seat assembly includes a fitting coupled to the valve body, a seat ring coupled to the fitting and defining a valve seat. The seat ring includes an inner groove formed on an interior surface of the seat ring. A control element is movable relative to the valve body between a closed position, in which the control element engages the valve seat, and an open position, in which the control element is spaced away from the valve seat. The seat ring is coupled to the fitting by snap-fit connection such that a portion of the fitting is disposed in the inner groove of the seat ring.

21 Claims, 4 Drawing Sheets

VALVE SEAT ASSEMBLY

FIELD OF DISCLOSURE

The present disclosure generally relates to a flow control device, and, more particularly, to a valve seat assembly of a flow control device.

BACKGROUND

Assembling a valve seat assembly within a valve body of a flow control device is cumbersome because assembly and installation require precise alignment of each component. As shown in FIGS. 1-3, a known flow control valve 10 with a valve seat assembly 12 is illustrated. The control valve 10 includes a valve body 14 defining an inlet 18, an outlet 22, and a flow path 26 connecting the inlet 18 and the outlet 22. A control element 30 is movable relative to the valve body 14 between a closed position, in which the control element 30 engages a valve seat 34 of the valve seat assembly 12, and an open position, in which the control element 30 is spaced away from the valve seat 34. In FIGS. 2 and 3, the valve seat assembly 12 is shown in greater detail and includes a seat ring 40 defining the valve seat 34, a retaining ring 44, a fitting 48, and an O-ring 52.

Installing the valve seat assembly 12 includes precisely aligning both the seat ring 40 between the retaining ring 44 and the fitting 48, and the O-ring 52 between the seat ring 40, retaining ring 44, and the fitting 48. To do so, the retaining ring 44 is first inserted into the inlet portion of the valve body 14. The seat ring 40 and the O-ring 52, which is disposed against an outer surface 56 of the seat ring 40, are then placed into a groove 60 formed in the retaining ring 44. The fitting 48 is then inserted into the valve body 14 such that a portion of the fitting 48 sandwiches the seat ring 40 and the O-ring 52 against the groove 60 of the retaining ring 44. Finally, the retaining ring 44 and the fitting 48 are fastened to the valve body 14. As shown in FIG. 2, when the valve 10 is in a closed position, the control element 30 engages the valve seat 34 of the seat ring 40. When the valve 10 is in an open position, as shown in FIG. 3, the control element 30 is spaced away from the seat ring 40 to allow fluid to flow through the flow path.

Even after assembly, however, there is risk that the seat ring 40 and the O-ring 52 may become dislodged in high-pressure environments. For example, when the valve 10 is in an open position, as shown in FIG. 3, fluid flows through a narrow opening 64 created between the control element 30 and the seat ring 34. A vacuum may be created, forcing the seat ring 40 and/or the O-ring 52 out of placement relative to the retaining ring 44. With the seat ring 40 dislodged, the flow control valve 10 can no longer provide a fluid-tight seal when the control element 30 is in the closed position.

SUMMARY

In accordance with a first exemplary aspect, a flow control device may include a valve body defining an inlet, an outlet, and a flow path connecting the inlet and the outlet. A valve seat assembly may include a fitting coupled to the valve body, and a seat ring. The seat ring may be coupled to the fitting and may define a valve seat. The seat ring may include an interior surface and an inner groove formed on the interior surface. A control element may be movable relative to the valve body between a closed position, in which the control element engages the valve seat, and an open position, in which the control element is spaced away from the valve seat. The seat ring may be coupled to the fitting by snap-fit connection such that a portion of the fitting is disposed in the inner groove of the seat ring.

In accordance with a second exemplary aspect, a valve seat assembly for a flow control device may include a fitting, and an O-ring. The seat ring may be coupled to the fitting, and may include an exterior surface and an outer groove defined on the exterior surface. The the O-ring may be disposed in the outer groove of the seat ring. The outer groove of the seat ring may be U-shaped.

In accordance with a third exemplary aspect, a valve body may define an inlet, an outlet, and a flow path connecting the inlet and the outlet. A valve seat assembly may include a fitting that is configured to be coupled to the valve body. A seat ring may be configured to be carried by the fitting. An interior surface of the seat ring may include a first portion that defines an inner groove and a second portion that defines a valve seat. A control element may be movable relative to the valve body between a closed position, in which the control element engages the valve seat, and an open position, in which the control element is spaced away from the valve seat. When the seat ring is carried by the fitting, a portion of the fitting may be disposed in the inner groove of the seat ring.

In accordance with a fourth exemplary aspect, a valve seat assembly for a flow control device may include a fitting and a seat ring. The seat ring may be configured to be carried by the fitting. An exterior surface of the seat ring may include an outer groove. An O-ring may be configured to be disposed in the outer groove of the seat ring. The outer groove of the seat ring may be U-shaped.

In further accordance with any one or more of the foregoing first, second, and third aspects, a flow control device or a valve seat assembly for a flow control device may further include any one or more of the following preferred forms.

In a preferred form, the seat ring may include an exterior surface and a U-shaped outer groove formed on the exterior surface of the seat ring.

In a preferred form, the flow control device may include an O-ring disposed in the U-shaped outer groove of the seat ring.

In a preferred form, the U-shaped outer groove of the seat ring is configured to receive an O-ring.

In a preferred form, the fitting may include an outer surface defining a ridge that is disposed in the inner groove of the seat ring.

In a preferred form, the seat ring may include a first portion that defines the inner groove.

In a preferred for, the first portion may be disposed between the fitting and the cage.

In a preferred form, the seat ring may include a second portion that defines the valve seat on the interior surface and an outer groove on the exterior surface.

In a preferred form, a first end of the fitting may have a mating surface shaped to mate with the inner groove of the seat ring.

In a preferred form, the seat ring may include an exterior surface that is adjacent to an interior surface of the cage.

In a preferred form, the interior surface of the seat ring may be adjacent to an exterior surface of the fitting.

In a preferred form, the flow control device may be a pressure regulating valve.

In a preferred form, the flow control device may be an axial flow control valve.

In a preferred form, the flow control device may be a slam-shut valve.

In a preferred form, the outer groove of the seat ring may be U-shaped.

In a preferred form, the fitting may be coupled to the seat ring by snap-fit connection.

In a preferred form, the fitting may include a ridge and the seat ring may include an interior surface and an inner groove defined on the interior surface.

In a preferred form, the ridge of the fitting may be disposed in the inner groove of the seat ring to couple the seat ring to the fitting.

In a preferred form, the seat ring may include a first portion defining an inner groove and a second portion defining the outer groove.

In a preferred form, the first portion may be disposed between the cage and the fitting.

In a preferred form, the first portion of the seat ring may be disposed around a first end of the fitting.

In a preferred form, cage may include an interior surface that is adjacent to the first portion and the second portion of the seat ring.

In a preferred form, a first end of the fitting may have a mating surface shaped to mate with the inner groove of the seat ring.

In a preferred form, the seat ring may include a collar shaped to surround a first end of the fitting.

In a preferred form, the collar may at least partially define an inner groove of the seat ring.

In a preferred form, the valve seat assembly may include a cage.

In a preferred form, the collar may be sandwiched between an exterior surface of the fitting and an interior surface of the cage.

In a preferred form, when the seat ring is carried by the fitting, the cage may be configured to surround the collar of the seat ring such that the collar of the seat ring is disposed between the fitting and the cage.

In a preferred form, when the seat ring is carried by the fitting, the exterior surface of the seat ring may be adjacent to an interior surface of the cage and an interior surface of the seat ring may be adjacent to an exterior surface of the fitting.

In a preferred form, the fitting may include an exterior mating surface that is configured to mate with an interior mating surface of the seat ring.

DETAILED DESCRIPTION

Figure 4:
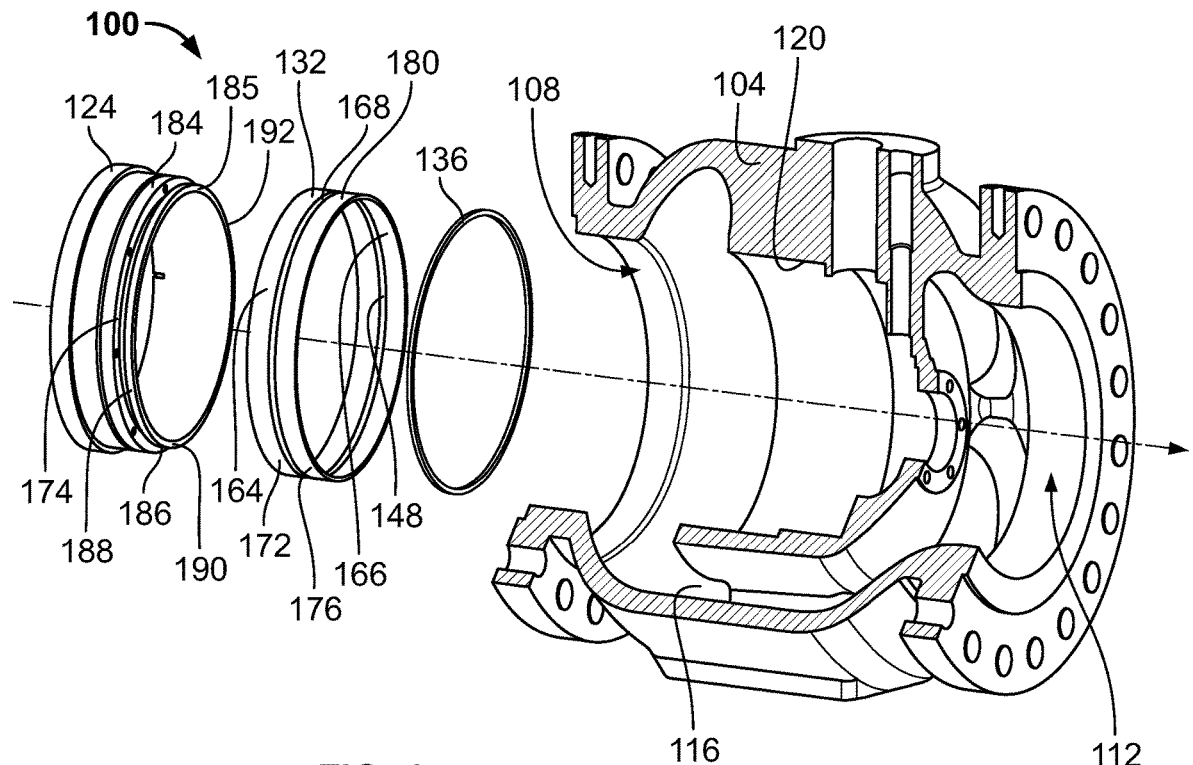
FIG. 4 is an exploded, perspective view of a valve body of a flow control device with a valve seat assembly assembled in accordance with the teachings of the present disclosure.

Turning now to FIGS. 4-7, a valve seat assembly 100 of a flow control device is constructed in accordance with the teachings of the present disclosure. As shown in the exploded view of FIG. 4, the valve seat assembly 100 is illustrated with a valve body 104. The valve body 104 includes an inlet 108, an outlet 112, and a flow path 116 connecting the inlet 108 and the outlet 112. The valve seat assembly 100 may be inserted into a bore 120 of the valve body 104 at the inlet 108, and includes a fitting 124, a seat ring 132, and an O-ring 136. While FIG. 4 illustrates the valve assembly 100 in an exploded view (i.e., the fitting 124 is separate from the seat ring 132, and the O-ring 136), the configuration and design of the disclosed valve seat assembly 100 permit the components of the assembly 100 to first be assembled as a unit before being inserted into the bore 120 of the valve body 104. As illustrated herein, the valve seat assembly 100 may be used with any number of flow control devices.

Figure 5:
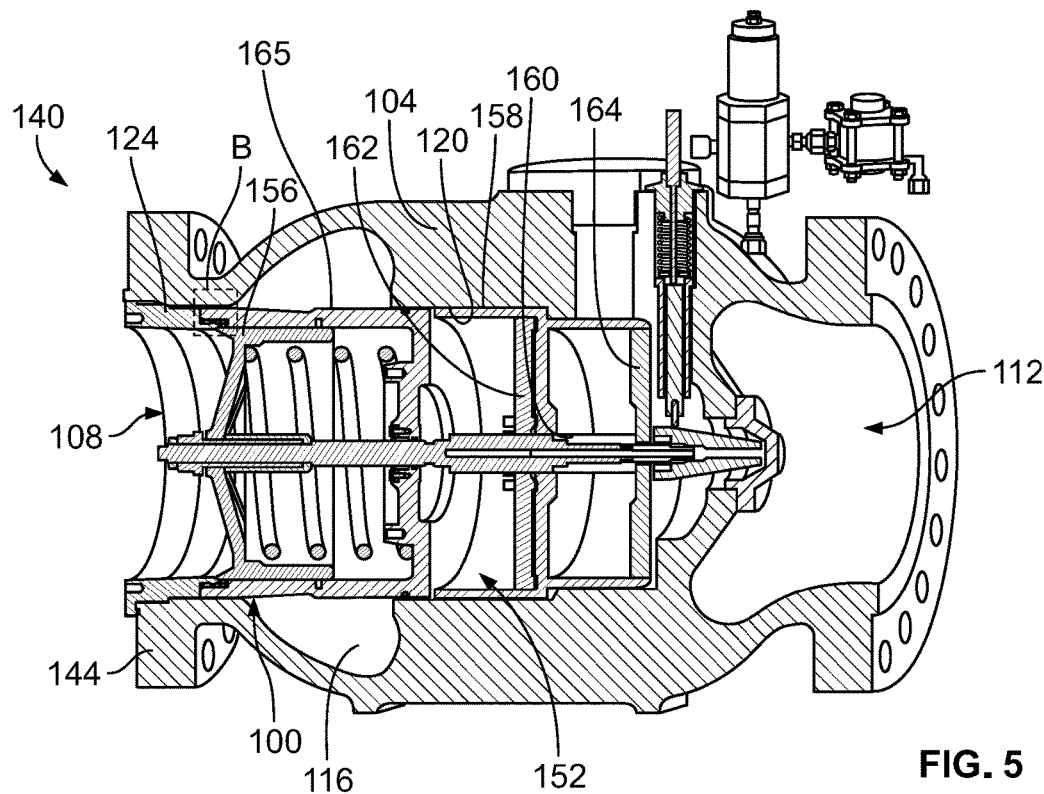
FIG. 5 is a cross-sectional view of the valve body and valve seat assembly of FIG. 4 used with a pressure regulating valve and assembled in accordance with the teachings of the present disclosure.

In a first example shown in FIG. 5, the valve seat assembly 100 and valve body 104 of FIG. 4 are shown in a pressure regulating valve 140, and are constructed in accordance with the teachings of the present disclosure. The valve seat assembly 100 is installed at a first end 144, or inlet end, of the valve body 104 and defines a valve seat 148 of the regulating valve 140. The regulating valve 140 includes an actuator assembly 152 disposed in the bore 120 of the valve body 104. The actuator assembly 152 includes a control element 156, a sleeve 158, a stem 160 extending through the sleeve 158, a first piston 162 coupled to the stem 160, and a second piston 164 coupled to the stem 160 and spaced away from the first piston 162. The sleeve 158 and/or the stem 160 may provide pathways to permit internal fluid communication to actuate the actuator assembly 152. The actuator assembly 152 is operatively coupled to the control element 156 and is configured to axially move the control element 156, relative to a cage 165, to open and close the pressure regulating valve 140. In particular, the control element 156 is movable relative to the valve body 104 between a closed position, in which the control element 156 engages the valve seat 148, and an open position, in which the control element 156 is spaced away from the valve seat 148.

As previously mentioned, the valve seat assembly 100 may be assembled together as a unit before the assembly 100 is installed within the valve body 104. For example, the O-ring 136 may be disposed in a groove of the seat ring 132, and then the seat ring 132, which carries the O-ring 136, may be clipped onto the fitting 124 before the fitting 124 is coupled to the valve body 104. Further, and as discussed in more detail below, the seat ring 132 and the fitting 124 are securely coupled by a clip structure configuration. The clip structure permits the fitting 124 to carry the seat ring 132, thereby facilitating assembly, installation, and removal of any one or all of the components of the valve seat assembly 100.

Figure 6:
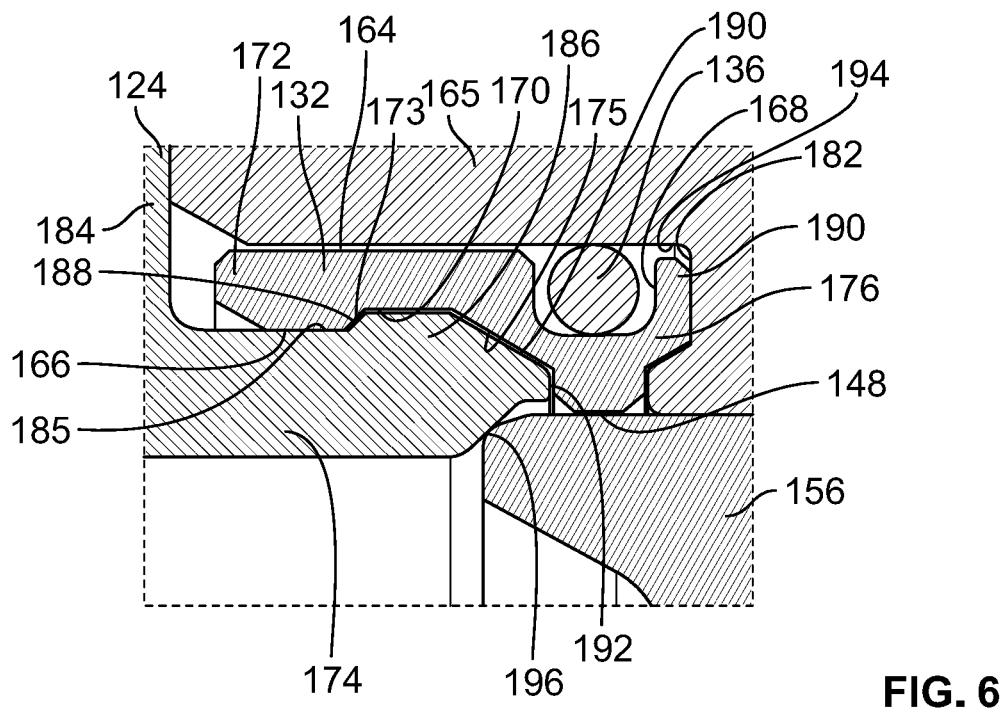
FIG. 6 is a magnified view of B of the valve seat assembly and control element of FIG. 5, showing the valve in a closed position.
Figure 7:
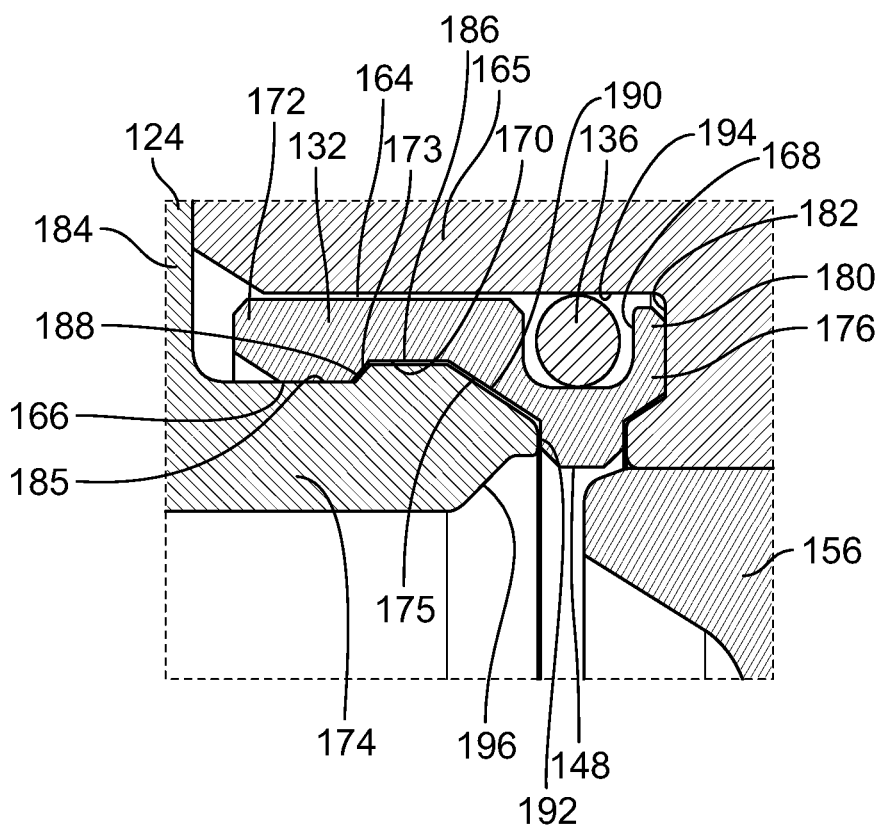
FIG. 7 is a magnified view of B of the valve seat assembly and control element of FIG. 5, showing the valve in an open position.

Turning now to FIGS. 6 and 7, the valve seat assembly 100 is shown in greater detail. In FIG. 6, the valve seat assembly 100 is shown when the flow control device 140 is in a closed position. In the closed position, the control element 156 engages the valve seat 148 and an interior surface 196 of the fitting 124. As shown in FIG. 7, the flow control device 140 is in an open position where the control element 156 is spaced away from the valve seat 148.

The fitting 124 is coupled to the seat ring 132 by a snap-fit, push-fit, or other similar mechanical connection. The seat ring 132 includes an exterior surface 164, an interior surface 166, an outer groove 168 formed on, or defined by, the exterior surface 164, and an inner groove 170 formed on, or defined by, the interior surface 166. A first portion 172 of the seat ring 132 forms a collar that surrounds a first end 174 of the fitting 124, and a second portion 176 of the seat ring 132 defines both the valve seat 148 and the outer groove 168. The first portion 172 is defined by a flat exterior portion and an uneven mating surface that defines the inner groove 170, a first angled surface 173, and a second angled surface 175. The first and second angled surfaces 173, 175 are adjacent to the inner groove 170. The outer groove 168 is located opposite the valve seat 148 and is U-shaped to receive the O-ring 136. The outer groove 168 is in part defined by a ledge 180 of the seat ring 132, which sits against an interior surface 182 of a cage. In the illustrated example, the O-ring 136 is disposed in the U-shaped outer groove 168 of the seat ring 132 such that the O-ring 136 is mostly surrounded by the seat ring 132. In this arrangement, the O-ring 136 is securely coupled to the seat ring 132 such that the seat ring 132 carries the O-ring 136. However, in other examples, the seat ring 132 may not include the ledge 180 to enclose the O-ring 136. The seat ring 132 is formed from a material such as Polytetrafluoroethylene (PTFE), which provides wear and chemical resistance and a smaller sealing force against the control element 156.

The fitting 124 is coupled to the valve body 104 at the inlet 108 and is configured to retain the actuator assembly 152 and the control element 156 within the bore 120 of the valve body 104. The fitting 124 includes the first end 174 that extends from a shoulder 184 at a right angle. The first end 174 of the fitting 124 has a uneven outer surface 185 that is shaped to mate with the inner groove 170 of the seat ring 132. The uneven surface 185 defines a ridge 186, a first sloped surface 188, and a second sloped surface 190 that terminates at a tip 192. The tip 192 is adjacent to the second portion 176 of the seat ring 132 and is perpendicularly disposed relative to the valve seat 148. The second angled surface 190 defines the tapered first end 174 to facilitate clipping the seat ring 132 to the fitting 124. During assembly of the seat ring 132 to the fitting 124, the tapered first end 174 of the fitting 124 gradually pushes the flexible first portion 172 of the seat ring 132 in an outward direction until the ridge 186 of the fitting 124 slides into the inner groove 170 of the seat ring 132. In the illustrated example, the cross-sectional profile of each of the first end 174 of the fitting 124 and the first portion 172 of the seat ring 132 match so that the ridge 186 of the fitting 124 sits flush against the inner groove 170 of the seat ring 132. However, in other examples, the mating surfaces of the fitting 124 and the seat ring 132 may have different or additional detailing such as corrugations, dimples, pegs, slots, ridges, grooves, etc., to couple the seat ring 132 to the fitting 124.

A portion of the valve cage 165 is shown in FIGS. 6 and 7. The cage 165 may be directly coupled to the valve body 104, or may be held in place by the fitting 124 within the bore 120 of the valve body 104. The cage 165 includes an interior surface 194 that surrounds the exterior surface 164 and ledge 180 of the seat ring 132. The interior surface 194 of the cage 165 is disposed adjacent to the exterior surface 164 of the seat ring 132 such that the first portion 172 of the seat ring 132 is sandwiched between the first end 174 of the fitting 124 and the cage 165. In other words, a portion of the exterior surface 164 of the seat ring 132 is adjacent to the interior surface 194 of the cage 165 and a portion of the interior surface 166 of the seat ring 132 is adjacent to the exterior surface 185 of the fitting 124. While the example flow control device 140 provides a cage 165, the valve assembly 100 may be used with a flow control device that does not have a cage.

Turning back to FIG. 5, the fitting 124 is removably coupled to the valve body 104. For example, external threads on the fitting 124 may couple to internal threads at the inlet 108 of the valve body 104. Similarly, the fitting 124 may be bolted to the inlet 108 of the valve body 104. Because the fitting 124 is removable from the valve body 104, the internal components (e.g., the actuator assembly 152 and the control element 156) of the regulating valve 140 are insertable and removable through the inlet 108. However, in another example, the inlet 108 and the outlet 112 may be switched (i.e., such that fluid flows from the right to the left) in which case the internal components of the regulating valve 140 would be removably disposed through the outlet 112 of the valve body 104.

In operation, the actuator assembly 152 of the regulating valve 140 actuates the control element 156 between the open position and the closed position in response to the balance of fluid pressures in first, second, third, and fourth chambers defined between the sleeve 158 and the first and second pistons 162, 164. In the illustrated example, the first and third chambers are in fluid communication via a pathway formed in the sleeve 158, and the second and fourth chambers are in fluid communication via a passage of the stem 160. Fluid pressure in the first and third chambers operates on the upstream surfaces of the first and second pistons 162, 164, respectively, to urge the first and second pistons 162, 164 toward the open position of the regulating valve 140. Fluid pressure in the second and fourth chambers operates on the downstream surfaces of the first and second pistons 162, 164, respectively, to urge the first and second pistons 162, 164 toward the closed position of the regulating valve 140.

Figure 8:
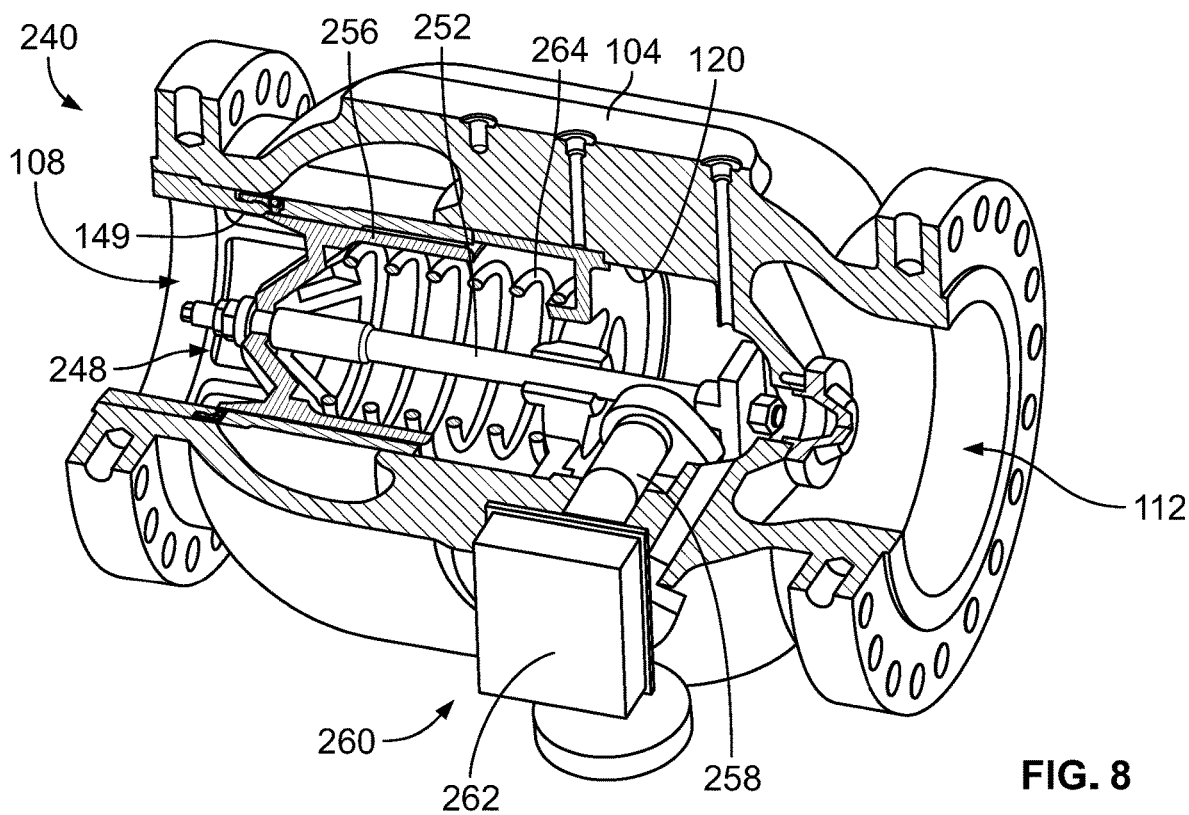
FIG. 8 is a cross-sectional view of the valve body and valve seat assembly of FIG. 4 used with a slam-shut valve and assembled in accordance with the teachings of the present disclosure.

Referring now to FIG. 8, another exemplary flow control device 240 is assembled with the valve body 104 and valve seat assembly 100 of FIG. 4. More specifically, the valve body 104 is used to assemble a slam-shut valve 240. Components of the slam-shut valve 240 are inserted into the bore 120 of the valve body 104, and a portion of the slam-shut valve 240 is inserted into a through-hole through the valve body 104. Because the fitting 124 of the valve seat assembly 100 is removable from the valve body 104, the internal components (e.g., the actuator assembly and the control element) of the slam-shut valve 240 are insertable and removable through the inlet 108.

A valve assembly 248 of the slam-shut valve 240 is arranged in the valve body 104, and includes a valve stem 252 and a control element 256 coupled to the stem 252. The valve stem 252 and control element 256 of the valve assembly 248 are movable between an open position, in which the control element 256 is spaced away from the valve seat 148 of the valve seat assembly 100, and a closed position, in which the control element 256 engages the valve seat 148. The control element 256 is biased toward the closed position, in which the control element 256 sealingly engages the valve seat 148 to prevent fluid flow between the inlet 108 and the outlet 112. While the seat assembly 100 is illustrated with the control element 156 of the regulating valve 140, the control element 256 of the slam-shut valve 240 engages the valve seat assembly 100 in the same way as shown in FIGS. 6 and 7.

An actuator shaft 258 of an actuator assembly 260 is coupled to an end of the valve stem 252 opposite the control element 256. The actuator shaft 258 is disposed through the valve body 104 and is operatively coupled to a trigger mechanism 262. The trigger mechanism 262 is responsive to fluid pressure and is arranged outside of the valve body 104. In operation, when the slam-shut valve 240 is open, fluid can flow through the inlet 108, and the slam-shut valve 240 will be maintained in this open position absent any over-pressure or under-pressure condition for which the trigger mechanism 262 has been configured. When an over-pressure or under-pressure condition is detected by the trigger mechanism 262, the trigger mechanism 262 releases the stem 252, which allows the control element 256 to move to the closed position under the force of a spring. When the over-pressure or under-pressure condition is cleared, the slam-shut valve 240 can be reset (i.e., opened) via a handle (not shown) disposed outside of the valve body 104.

Figure 9:
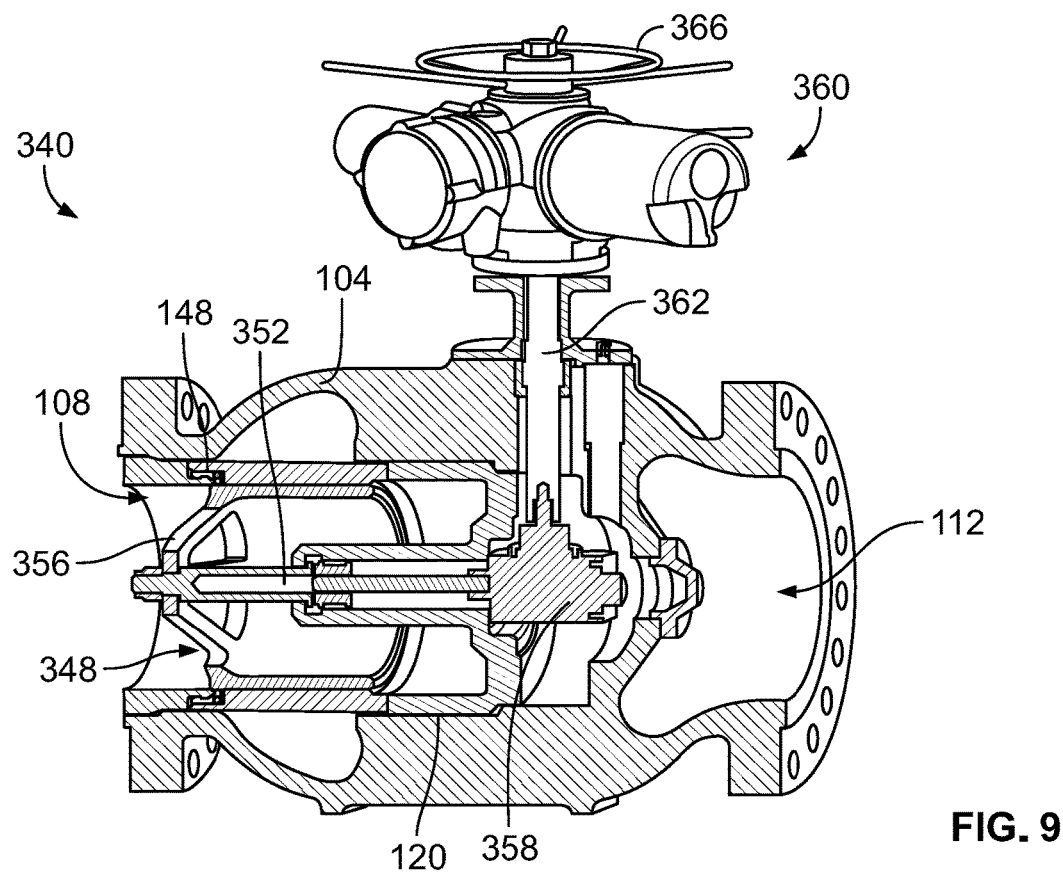
FIG. 9 is a cross-sectional view of the valve body and valve seat assembly of FIG. 4 used with a flow control valve and assembled in accordance with the teachings of the present disclosure.

Referring now to FIG. 9, another exemplary flow control device 340 is assembled with the valve body 104 and valve seat assembly 100 of FIG. 4. More specifically, the valve body 104 is used to assemble a flow control valve 340. The flow control valve 340 includes a valve assembly 348 inserted into the bore 120 and arranged in the valve body 104. Because the fitting 124 of the valve seat assembly 100 is removable from the valve body 104, the internal components (e.g., the actuator assembly and the control element) of the flow control valve 340 are insertable and removable through the inlet 108.

The valve assembly 348 includes a valve stem 352 and a control element 356 coupled to the stem 352. The valve stem 352 and the control element 356 of the valve assembly 348 are movable between an open position, in which the control element 356 is spaced away from the valve seat 148, and a closed position, in which the control element 356 engages the valve seat 148. When the control element 356 is in the closed position, the control element 356 sealingly engages the valve seat 148 to prevent fluid flow between the inlet 108 and the outlet 112 of the valve body 104. While the seat assembly 100 is illustrated with the control element 156 of the regulating valve 140, the control element 356 of the flow control valve 340 engages the valve seat assembly 100 in the same way as shown in FIGS. 6 and 7.

In the exemplary flow control valve 340, the valve stem 356 is connected to a reversing mechanism 358 of an actuator assembly 360. A shaft 362 of the actuator assembly 360 is coupled to the reversing mechanism 358, and the shaft 362 delivers a rotational input to the reversing mechanism 358. The reversing mechanism 358 converts the rotational motion of the shaft 362 to linear motion of the valve stem 352 and control element 356 to open and close the flow control valve 340. In this example, the reversing mechanism 358 may include any gear transmission or gearbox having a spur gear, fixed-axis gear structure, turbine worm structure, bevel gear structure, or any other suitable transmission.

Figure 1:
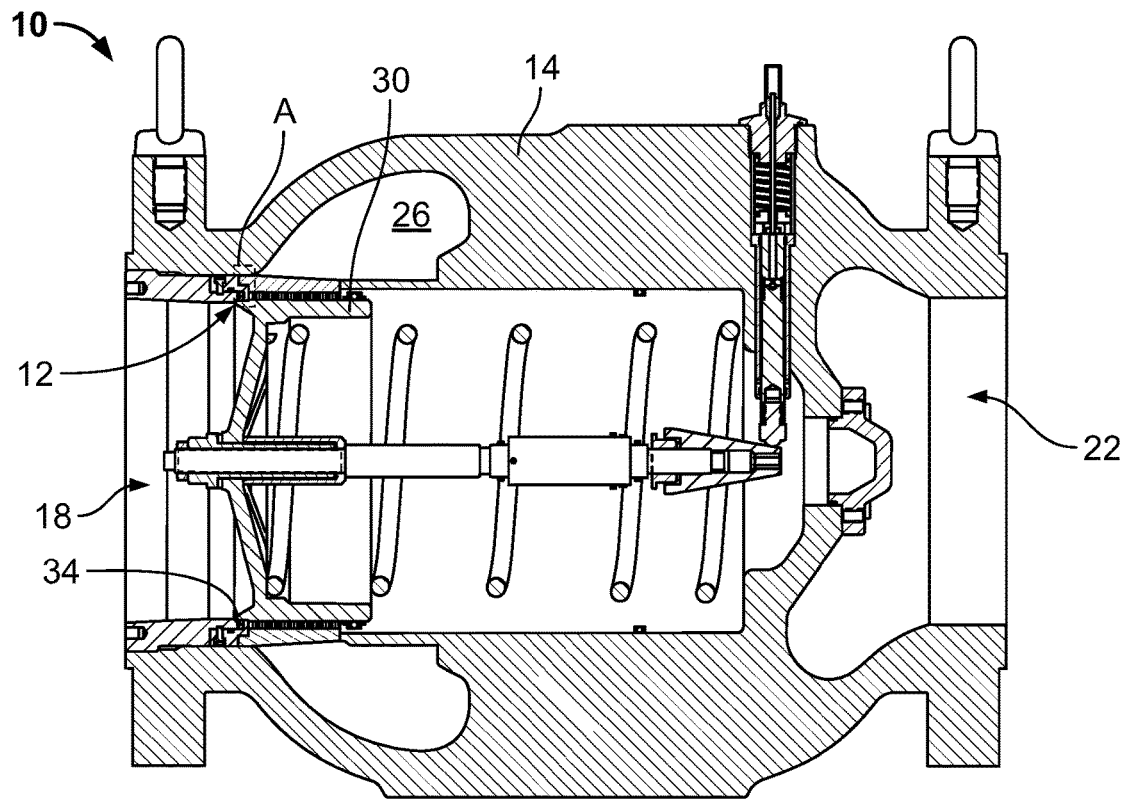
FIG. 1 is a flow control device with a known valve seat assembly.
Figure 2:
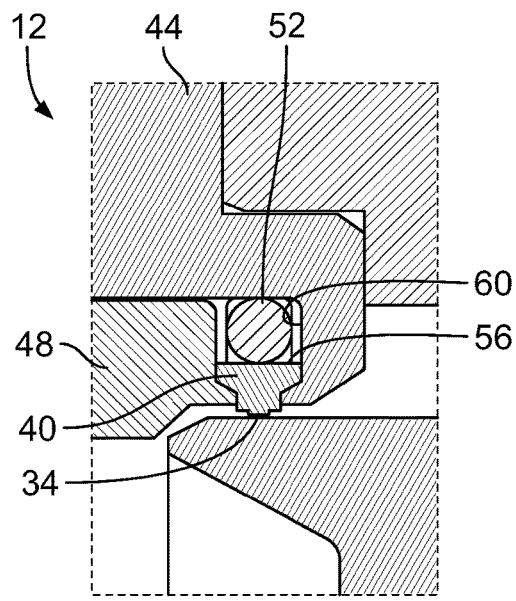
FIG. 2 is a magnified view of A of the flow control device of FIG. 1, showing the valve in a closed position.
Figure 3:
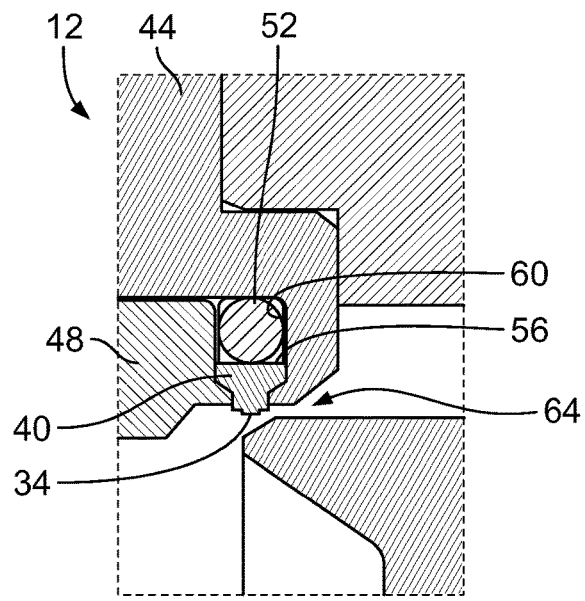
FIG. 3 is a magnified view of A of the flow control device of FIG. 1, showing the valve in an open position.

The clip mounting structure of the valve seat assembly 100 greatly simplifies installation and removal of the valve seat assembly 100 from any number of flow control devices such as the pressure regulating valve 140, slam-shut valve 240, and flow control valve 340 disclosed herein. Additionally, the U-shaped outer groove 168 of the seat ring 132 securely couples the O-ring 136 to the seat ring 132 such that the O-ring 136 can be installed, removed, and/or replaced more easily, as well. To remove and/or replace the seat ring 132 or O-ring 136 of the valve seat assembly 100, an operator would only need to remove the fitting 124, which carries both the seat ring 132 and the O-ring 136. As compared to the known seat ring 40 of FIG. 1, for example, the disclosed seat ring 132 has a larger mating surface with the fitting 124 and is therefore more securely attached to the fitting 124. As such, the disclosed seat ring 132 is less susceptible pressure drops that may cause known valve seat rings and/or O-rings to become dislodged or suctioned out of alignment.

Any of the components of the valve seat assembly 100 may be made using an additive manufacturing (AM) technique or process that builds three-dimensional objects by adding successive layers of material on a material or receiving surface. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, a multi-jet modeling ("MJM") process, a selective laser sintering ("SLS") process, a selective laser melting ("SLM") process, an electronic beam melting ("EBM") process, and an arc welding AM process. In some embodiments, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create each component of the valve seat assembly according to the present disclosure, and are not limited to the techniques herein.

The figures and description provided herein depict and describe preferred embodiments of a flow control device for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the flow control device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed is:

1. A flow control device comprising:
  a valve body defining an inlet, an outlet, and a flow path connecting the inlet and the outlet;
  a valve seat assembly including
    a fitting that is configured to be coupled to the valve body; and a seat ring that is configured for being carried by the fitting, wherein an interior surface of the seat ring includes a first portion that defines an inner groove and a second portion that defines a valve seat; and a control element movable relative to the valve body between a closed position, in which the control element engages the valve seat, and an open position, in which the control element is spaced away from the valve seat;

wherein when the seat ring is carried by the fitting, a portion of the fitting is disposed in the inner groove of the seat ring.

2. The flow control device of claim 1, wherein the seat ring includes an exterior surface and a U-shaped outer groove formed on the exterior surface of the seat ring.

3. The flow control device of claim 2, wherein the U-shaped outer groove of the seat ring is configured to receive an O-ring.

4. The flow control device of claim 1, wherein the fitting includes an outer surface defining a ridge that is disposed in the inner groove of the seat ring.

5. The flow control device of claim 1, further comprising a cage disposed within the valve body such that the first portion of the seat ring is disposed between the fitting and the cage.

6. The flow control device of claim 5, wherein the exterior surface that is adjacent to an interior surface of the cage and the interior surface of the seat ring is adjacent to an outer surface of the fitting.

7. The flow control device of claim 1, wherein a first end of the fitting has a mating surface shaped to mate with the inner groove of the seat ring.

8. The flow control device of claim 1, wherein the flow control device is a pressure regulating valve.

9. The flow control device of claim 1, wherein the flow control device is an axial flow control valve.

10. The flow control device of claim 1, wherein the flow control device is a slam-shut valve.

11. A valve seat assembly for a flow control device, the assembly comprising:
a fitting;
a seat ring that is configured for being carried by the fitting, wherein an exterior surface of the seat ring includes an outer groove; and
an O-ring that is configured to be disposed in the outer groove of the seat ring;
wherein the outer groove of the seat ring is U-shaped.

12. The assembly of claim 11, wherein the fitting is coupled to the seat ring by snap-fit connection.

13. The assembly of claim 11, wherein the fitting includes a ridge and the seat ring includes an interior surface and an inner groove defined on the interior surface, the ridge disposed in the inner groove to couple the seat ring to the fitting.

14. The assembly of claim 11, wherein the seat ring includes a first portion defining an inner groove and a second portion defining the outer groove, the first portion configured to be disposed between a cage and the fitting.

15. The assembly of claim 14, wherein the first portion of the seat ring is disposed around a first end of the fitting.

16. The assembly of claim 14, wherein a first end of the fitting has a mating surface shaped to mate with the inner groove of the seat ring.

17. The assembly of claim 11, wherein the seat ring includes a collar shaped to surround a first end of the fitting, the collar at least partially defining an inner groove of the seat ring.

18. The assembly of claim 17, further comprising a cage, wherein when the seat ring is carried by the fitting, the cage is configured to surround the collar of the seat ring such that the collar of the seat ring is disposed between the fitting and the cage.

19. The assembly of claim 18, wherein when the seat ring is carried by the fitting, the exterior surface of the seat ring is adjacent to an interior surface of the cage and an interior surface of the seat ring is adjacent to an outer surface of the fitting.

20. The assembly of claim 11, wherein the fitting includes an outer surface that is configured to mate with an interior surface of the seat ring.

21. A flow control device comprising:
a valve body defining an inlet, an outlet, and a flow path connecting the inlet and the outlet;
a valve seat assembly including
a fitting that is configured to be coupled to the valve body, the fitting including an outer surface defining a ridge; and
a seat ring that is configured to be carried by the fitting, wherein an interior surface of the seat ring includes a first portion that defines an inner groove and a second portion that defines a valve seat; and
a control element movable relative to the valve body between a closed position, in which the control element engages the valve seat, and an open position, in which the control element is spaced away from the valve seat;
wherein when the seat ring is carried by the fitting, the ridge of the fitting is disposed in the inner groove of the seat ring.

* * * * *

UNITED STATES PATENT AND TRADEMARK OFFICE
CERTIFICATE OF CORRECTION

PATENT NO. : 11,639,755 B2
APPLICATION NO. : 17/153638
DATED : May 2, 2023
INVENTOR(S) : Shengjin Chen et al.

It is certified that error appears in the above-identified patent and that said Letters Patent is hereby corrected as shown below:

On the Title Page

Below "Item (65)" insert -- (30) Foreign Application Priority Data
Jan. 21, 2020 (CN) ............... 202010070022.0 --.

In the Specification

Column 2, Line 8, "The the" should be -- The --.

Column 2, Line 50, "for," should be -- form, --.

Column 8, Line 11, "susceptible" should be -- susceptible to --.

In the Claims

Column 8, Line 65, "including" should be -- including: --.

Column 10, Line 35, "including" should be -- including: --.

Signed and Sealed this
Twenty-sixth Day of March, 2024

Katherine Kelly Vidal
*Director of the United States Patent and Trademark Office*